United States Patent [19]
Felker

[11] Patent Number: 5,743,589
[45] Date of Patent: Apr. 28, 1998

[54] TRUCK BED WIND DEFLECTOR

[76] Inventor: Raymond J. Felker, 402 Princess Dr., Corpus Christi, Tex. 78410

[21] Appl. No.: 695,649

[22] Filed: Aug. 12, 1996

[51] Int. Cl.[6] .................................................. B62D 35/00
[52] U.S. Cl. .................... 296/180.5; 296/180.1; 296/37.6; 296/57.1
[58] Field of Search ............... 296/180.1, 180.5, 296/57.1, 37.6

[56]  References Cited

U.S. PATENT DOCUMENTS

| | | | |
|---|---|---|---|
| D. 254,063 | 1/1980 | Anziano | D12/156.87 |
| D. 351,819 | 10/1994 | Baddeley | D12/181 |
| D. 360,395 | 7/1995 | Almen | D12/181 |
| 4,451,075 | 5/1984 | Canfield | 296/180.1 |
| 4,506,870 | 3/1985 | Penn | 296/180.1 |
| 4,585,263 | 4/1986 | Hesner | 296/180.1 |
| 5,069,498 | 12/1991 | Benchoff | 296/180.1 |
| 5,232,259 | 8/1993 | Booker | 296/37.6 |
| 5,234,249 | 8/1993 | Dorrell | 296/180.1 |
| 5,236,242 | 8/1993 | Seeman | 296/180.1 |
| 5,273,339 | 12/1993 | Flynn | 296/180.1 |
| 5,320,397 | 6/1994 | Peterson et al. | 296/180.1 |
| 5,340,184 | 8/1994 | Conrado | 296/50 |
| 5,352,008 | 10/1994 | Denvir | 296/50 |
| 5,374,098 | 12/1994 | Nelson | 296/180.5 |
| 5,411,312 | 5/1995 | Stallings | 296/180.1 |

FOREIGN PATENT DOCUMENTS

| | | | |
|---|---|---|---|
| 454945 | 11/1991 | WIPO | 296/180.5 |

*Primary Examiner*—Gary C. Hoge
*Attorney, Agent, or Firm*—David L. Volk

[57]  ABSTRACT

A substantially planar, substantially rectangular wind deflector including an extendable portion is pivotally attached to a truck. The deflector includes an extendable portion and is configured and arranged to extend between a top edge of a tailgate and a bed when the extendable portion is in an extended position, forming an inclined surface over which air flows when such a vehicle is in forward motion. The tailgate or the bed may alternatively include a recess therein to receive the deflector in a non-deployed position.

2 Claims, 14 Drawing Sheets

TRUCK BED WIND DEFLECTOR

BACKGROUND OF THE INVENTION

1. Field of the Invention

The present invention relates to pickup truck accessories, specifically to a drag reducing wind deflector for a pickup truck bed.

2. Description of the Related Art

The problems associated with the aerodynamic turbulence associated with the standard configuration of a pick-up truck tailgate are well known. Increased drag reduces fuel efficiency, and increased turbulence creates a "buffeting" motion which can cause instability at highway speeds.

Furthermore, this air turbulence can create a negative air pressure zone immediately above the truck bed which imparts a lifting force above the rear axle, futher contributing to instability.

It has been known that by lowering or removing the tailgate altogether, a reduction in these effects can be accomplished.

In the related art, several devices are known for aerodynamically improving the tailgate structure of a pickup truck. For example, in U.S. Pat. No. 5,234,249, issued in the name of Dorrell, an air drag reducing tailgate apparatus is disclosed which can adjustably position the tailgate into a partially open position. Such a solution to the problem of increased tailgate drag decreases the security of cargo within the truck bed.

Also, in U.S. Pat. No. 5,411,312, issued in the name of Stallings, a tailgate wind deflector apparatus is disclosed. A problem occurring from the use of such an apparatus is the displacement such a device causes to the useable truck bed cargo area.

Consequently, a need has been felt for providing a drag reducing wind deflector which can be built into or bolted onto a pickup truck bed and can alternately be folded flat, thereby minimizing storage space requirements when not in use.

SUMMARY OF THE INVENTION

It is therefore an object of the present invention to provide an improved drag reducing wind deflector for a pickup truck bed.

It is another object of the present invention to provide an improved wind deflector for a truck bed which can be stored in such a manner as to minimally interfere with the available storage area of the pickup truck bed.

It is a feature of the present invention to provide an improved drag reducing wind deflector for a pickup truck bed that can be easily adapted to be either manufactured for use with a uniquely configured pickup truck bed, or also as an aftermarket "bolt-on" apparatus for conventional truck beds.

Briefly described according to one embodiment of the present invention, a telescoping wind deflector is provided having a main body attached to an extension, and attachment devices for hingedly connecting the main body to a truck bed. In accordance with one embodiment, the extension is telescopingly received within the main body, and the main body is hingedly connected to the truck bed. When the extension is retracted within the main body, the entire telescoping deflector can be pivoted flat against the truck bed. Alternately, when the extension is extended telescopingly outward, the telescoping deflector can be pivoted upward to rest upon the tail gate, thereby creating an aerodynamic "wedge" at the rear of the truck bed. Adaptations of this embodiment provide for manufacturing the deflector integral to the truck bed, or addition of the device as an aftermarket product.

Another embodiment of the present invention has a second portion connected to a first portion by a pivoting hinge. Such an embodiment operates similarly to the telescoping version, with the second portion folded under the first portion for storage.

Another embodiment has the main body affixed to the upper edge of the tailgate instead of the truck bed. Such an embodiment, or variations thereof, would be disposed vertically adjacent the tailgate door when not deployed.

An advantage of the present invention is that it can be easily adapted for use either as original equipment integral with the truck, or as an add-on, aftermarket device.

Another advantage of the present invention is that it can be folded flat and stored within the pickup truck without significant interference to the cargo capacity of the pickup truck.

Further, a preferred embodiment of the present invention imparts improved aerodynamics to the pickup truck, thereby decreasing fuel consumption and increasing stability and handling characteristics of the truck during highway traffic.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DETAILED DESCRIPTION

Figure 1:
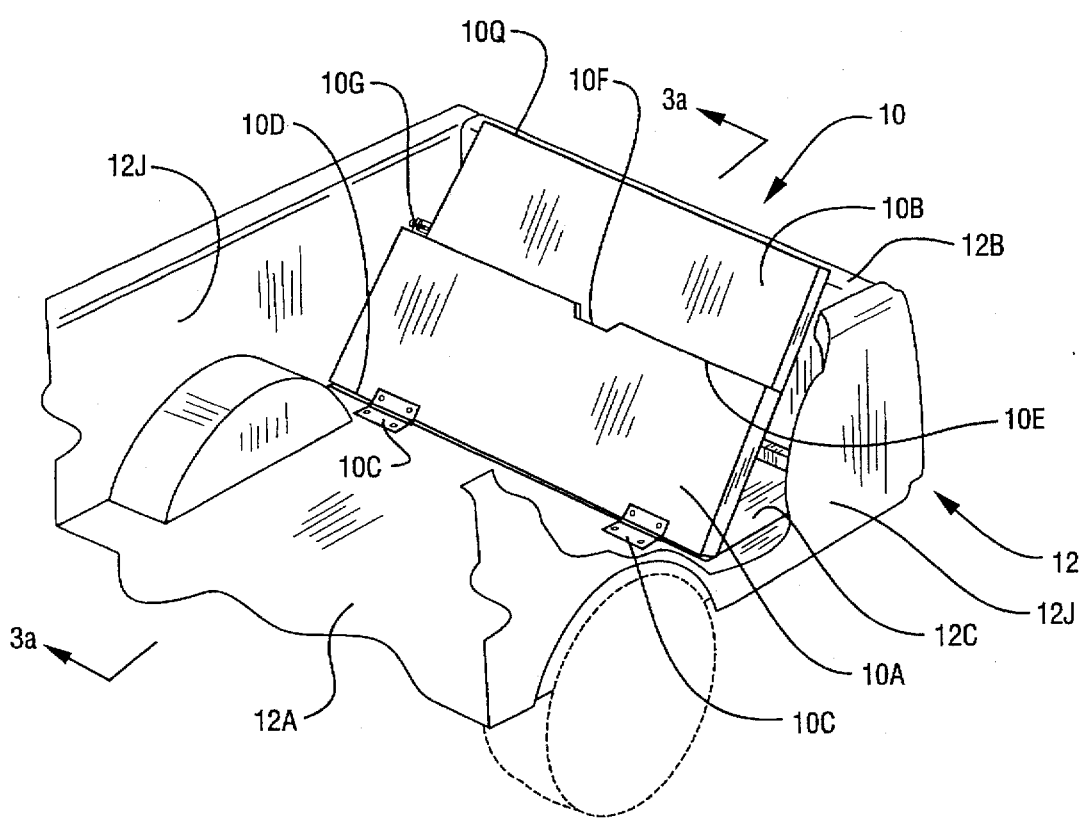
FIG. 1 is a perspective view of a telescoping wind deflector in a deployed position, shown mounted to a uniquely configured bed of a pickup truck.

FIG. 1 is a perspective view of a telescoping wind deflector 10 in a deployed position, shown mounted to a uniquely configured bed 12A of a pickup truck 12. The telescoping wind deflector 10 comprises a substantially planar, substantially rectangular, main body 10A and a substantially planar, substantially rectangular extension 10B. The main body 10A is configured to telescopingly receive the extension 10B. The main body 10A has a first long side 10D disposed adjacent the bed 12A. The first long side 10D is connected to the bed 12A by a plurality of attachment devices 10C. In the described embodiment, the attachment devices 10C are conventional hinges. It is within the scope of the present invention that any conventional type of pivoting attachment may be used in lieu of hinges. The first long side 10D extends substantially perpendicularly between the side walls 12J.

The main body 10A further includes a second long side 10E disposed opposite the first long side 10D. The extension 10B is arranged to telescope outwardly from the second long side 10E.

The extension 10B includes a distal side 10Q. When the telescoping wind deflector 10 is in a deployed position, the extension 10B is extended outward from the main body 10A and the distal side 10Q rests against the top edge of the tailgate 12B.

The main body 10A includes structure forming a cut-out 10F extending inward from the second long side 10E. The cut-out 10F permits a user (not shown) to firmly grasp an adequate portion of the extension 10B to facilitate pulling the extension 10B outward from the main body 10A.

The bed 12A of the truck 12 includes structure forming a substantially rectangular recess 12C positioned substantially between the tailgate 12B and the point of connection of the attachment devices 10C to the bed 12A. The recess 12C is configured to receive the telescoping wind deflector 10 when the extension 10B is received within the main body 10A and the telescoping deflector 10 is pivoted downward in a stored position.

The telescoping wind deflector 10 further includes a spring-bolt apparatus 10G connected to the main body 10A. The spring-bolt apparatus 10G fixes the extension 10B in the extended position, and is described herein later with reference to FIG. 2b.

Figure 2A:
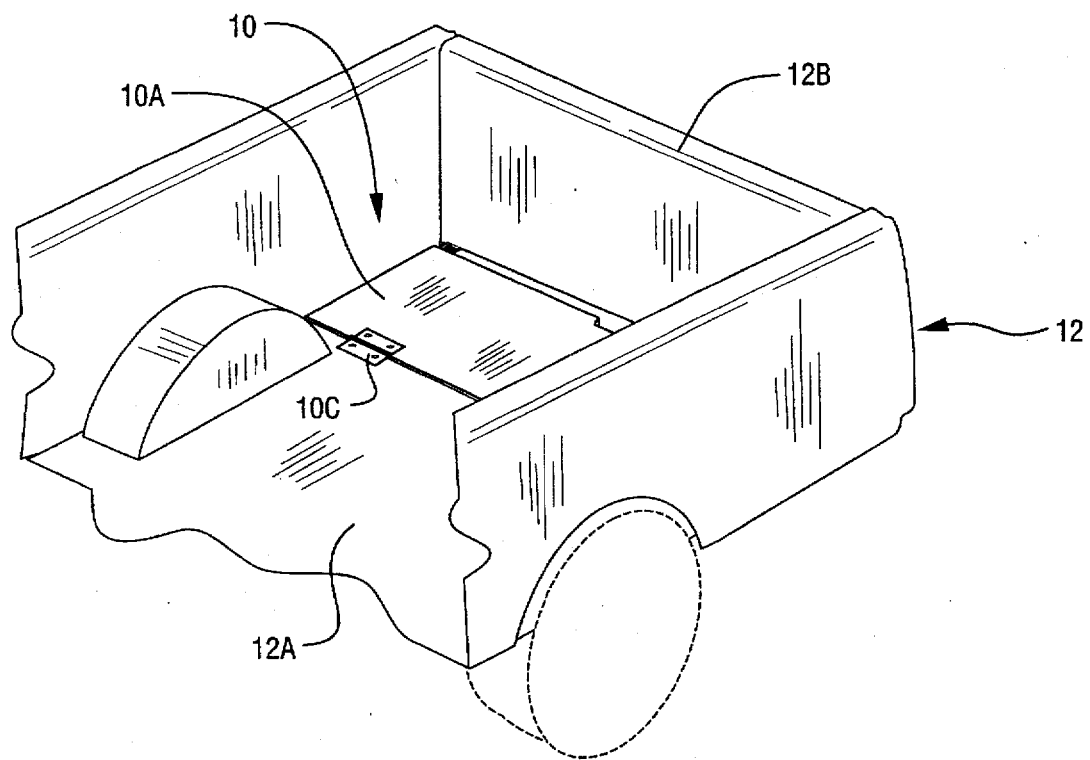
FIG. 2a is a perspective view thereof in a stored position.

FIG. 2a is a perspective view of the telescoping wind deflector 10 disposed within the recess 12C in the stored position, with the extension 10B received within the main body 10A. The top of the main body 10A is substantially parallel with the top of the truck bed 12A.

Figure 2B:
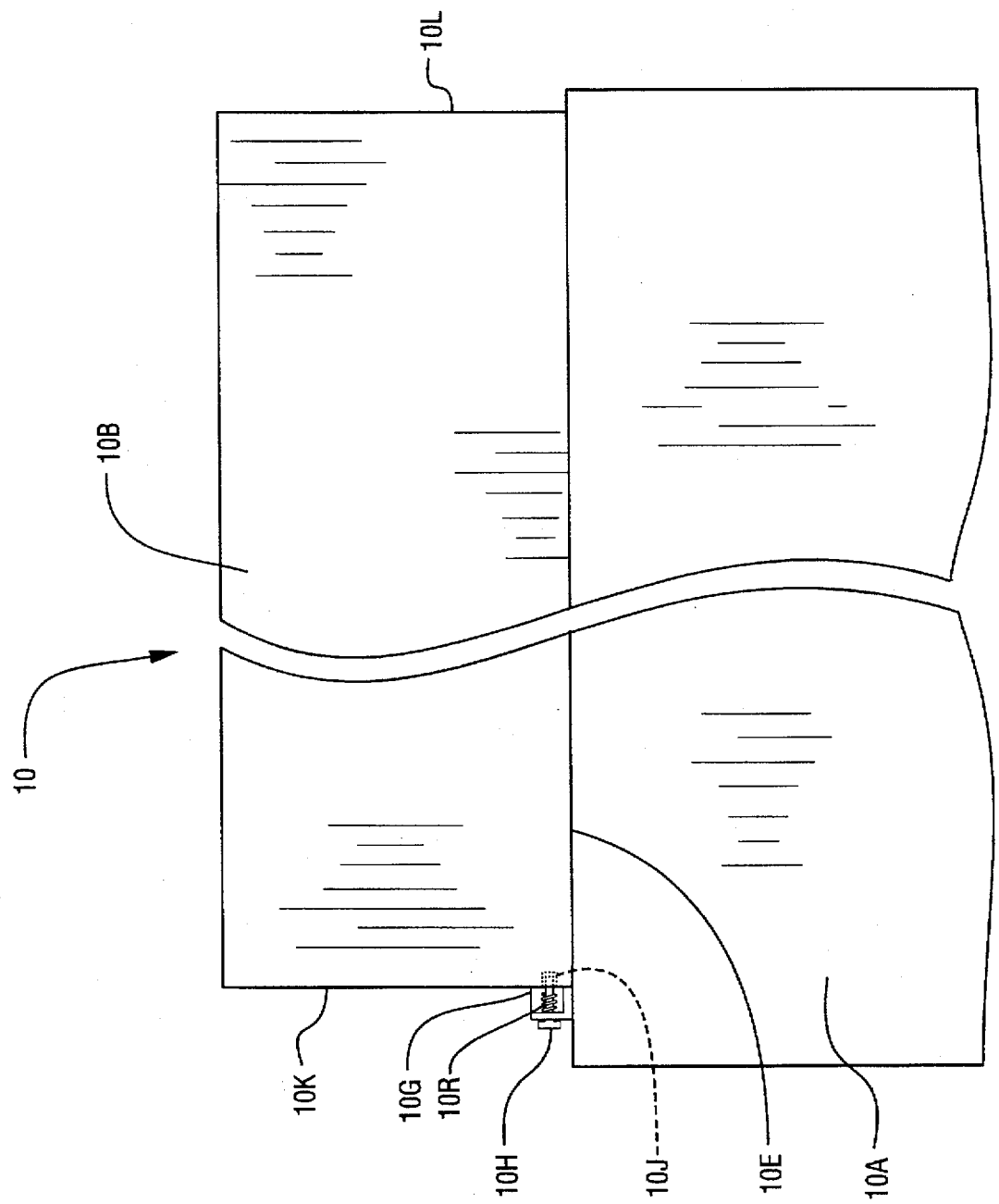
FIG. 2b is a partial elevational view thereof, shown apart from the truck for clarity.

FIG. 2b is a partial elevational view of the telescoping wind deflector 10. The extension 10B includes a first short side 10K and a second short side 10L disposed opposite the first short side 10K. The first and second short sides 10K, 10L are disposed substantially perpendicular to the second long side 10E of the main body 10A.

The spring-bolt apparatus 10G is connected to the second long side 10E near one end thereof, and includes a spring-loaded bolt 10H arranged substantially perpendicular to the first short side 10K of the extension 10B. The extension 10B includes structure forming a recess 10J within the first short side 10K. The recess 10J is positioned to align with the spring-loaded bolt 10H when the extension 10B is in the extended position. The bolt 10H is configured to be urged by a spring 10R into the recess 10J, thereby fixing the extension 10B in position.

To permit movement of the extension 10B, a user (not shown) pulls on the bolt 10H until the bolt 10H is withdrawn from the recess 10J, compressing the spring 10R.

Although the preferred embodiment includes the spring-bolt apparatus 10G shown and described, the scope of the invention includes any type of conventional mechanism for fixing the extension 10B in an extended position.

Figure 3A:
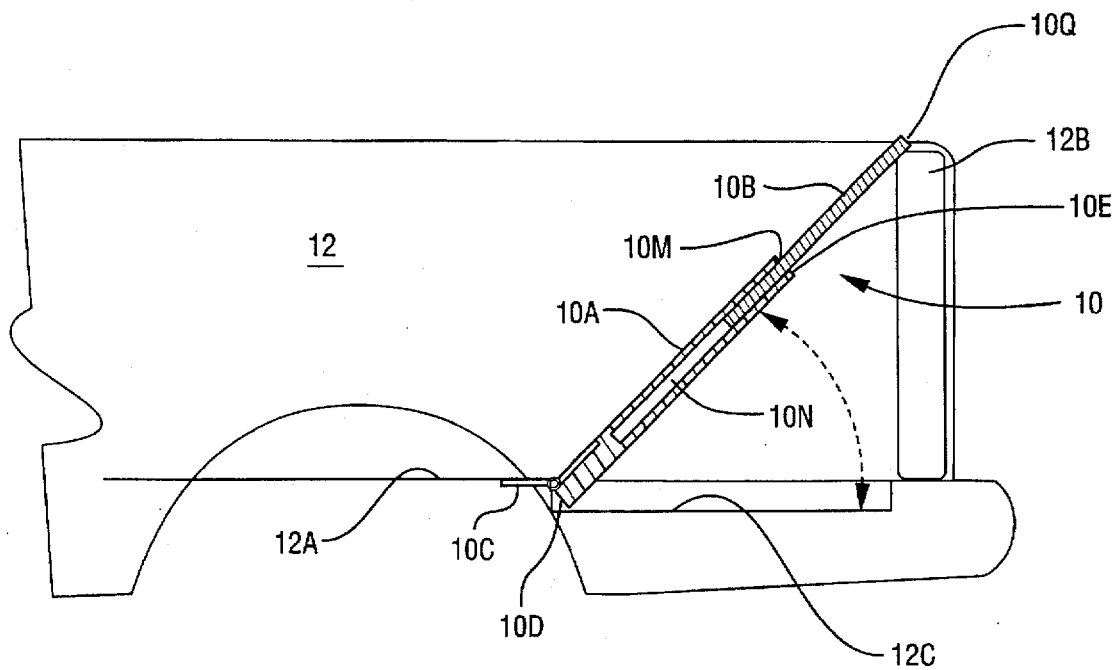
FIG. 3a is a cross-sectional view thereof taken along line 3a—3a of FIG. 1.

FIG. 3a is a cross-sectional view of the telescoping wind deflector 10 taken along line 3a—3a of FIG. 1. The telescoping wind deflector 10 includes a slot 10M in the second long side 10E through which the extension 10B is telescopingly received into structure forming a cavity 10N within the main body 10A. The attachment device 10C is connected to the truck bed 12A adjacent the recess 12C such that the main body 10A pivots upwardly out of the recess 12C and downwardly into the recess 12C as indicated by the dashed arrows.

Figure 3B:
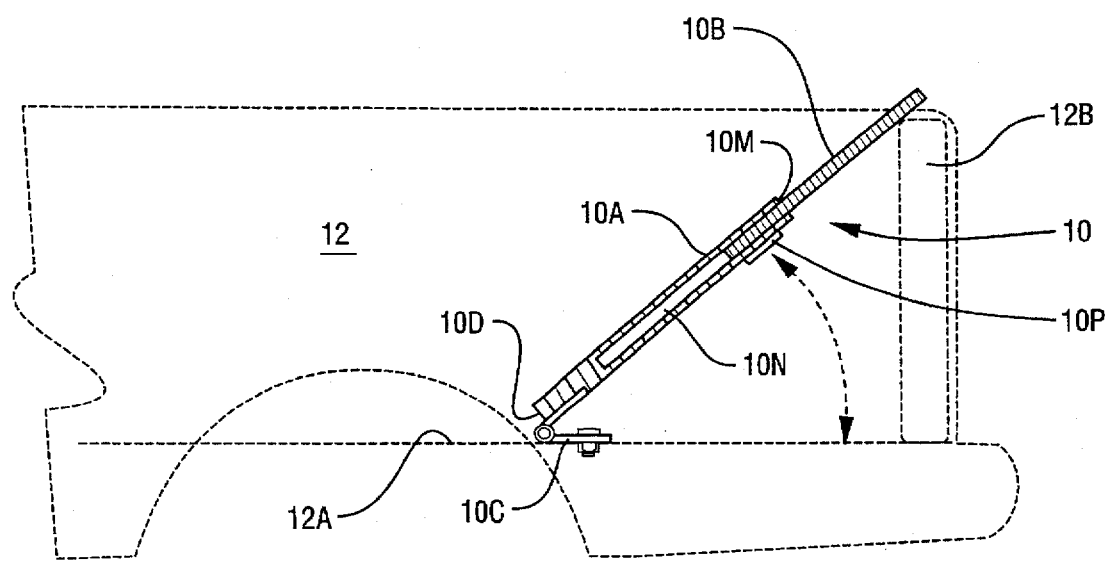
FIG. 3b is a cross-sectional view similar to FIG. 3a, except that it shows an alternative embodiment wherein the telescoping wind deflector is attached to an existing, conventional truck bed.

FIG. 3b is a cross-sectional view similar to FIG. 3a, except that it shows an alternative embodiment of the telescoping wind deflector 10 wherein the truck bed 12A is conventional and includes no recess 12C. This embodiment of the present invention is for after-market use with an existing truck 12. The telescoping wind deflector 10 is configured and arranged as for the already described embodiment except that the attachment devices 10C are configured for attachment to an existing truck bed 12A using conventional fasteners. The attachment devices 10C are arranged such that the main body 10A pivots upwardly away from the truck bed 12A and downwardly toward the truck bed 12A as indicated by the dashed arrows.

When the telescoping wind deflector 10 is pivoted completely downward toward the truck bed 12A and is thus in the stored position, the first end 10D is held away from the truck bed 12A by the attachment device 10C. A stop member 10P may be provided to level the telescoping wind deflector 10 with respect to the truck bed 12A when the telescoping wind deflector 10 is in the downward, stored position. The stop member 12P may be of any conventional shape, and is of the required thickness to level the telescoping wind deflector 10 with respect to the truck bed 12A.

Figure 4A:
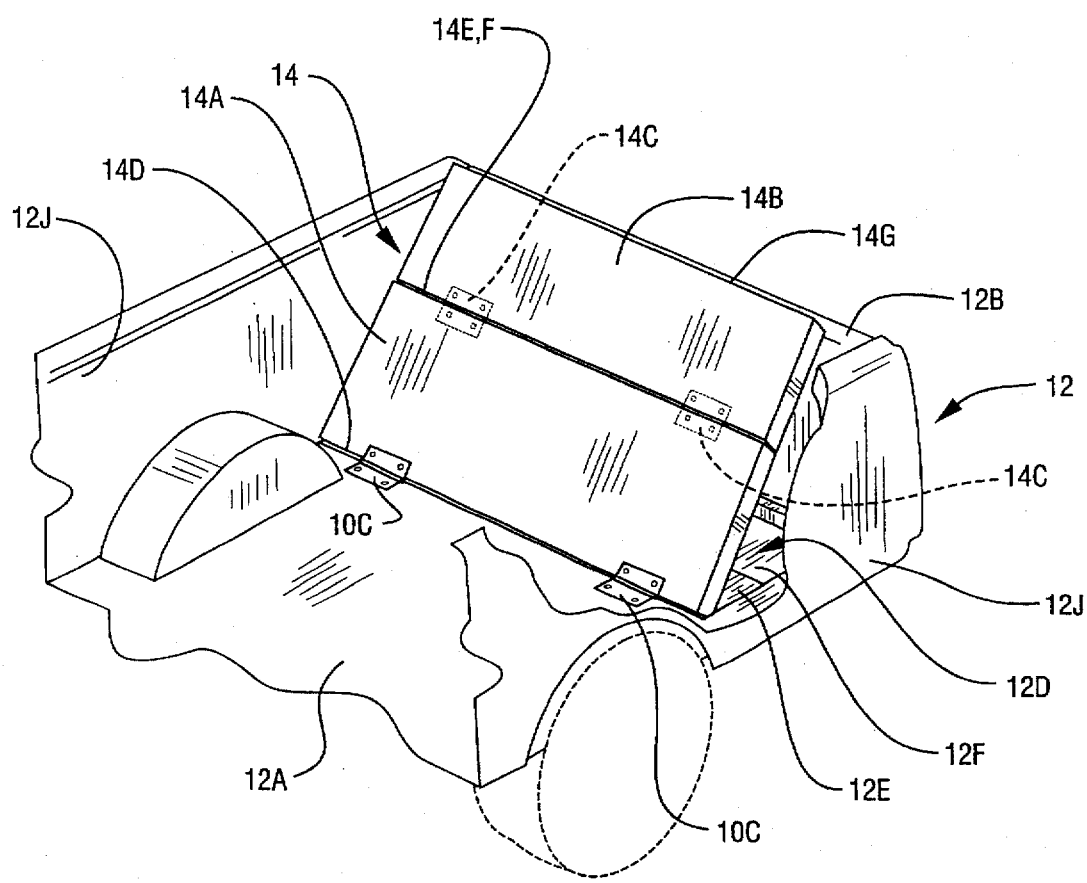
FIG. 4a is a perspective view of a folding wind deflector in a deployed position, shown mounted to a uniquely configured bed of a pickup truck.
Figure 4B:
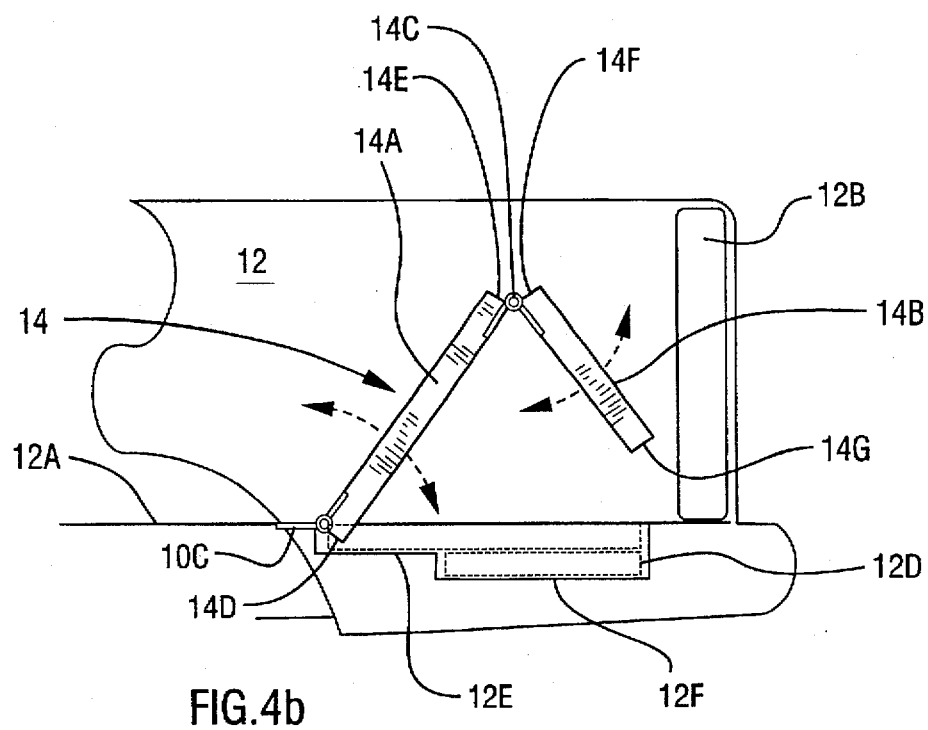
FIG. 4b is a side view thereof.

FIGS. 4a and 4b are a perspective view and a side view, respectively, of a folding wind deflector 14, comprising a substantially planar, substantially rectangular first portion 14A hingedly connected to a substantially planar, substantially rectangular second portion 14B. The first portion 14A includes a first portion first long side 14D disposed adjacent the bed 12A. The first portion first long side 14D is connected to the bed 12A by the attachment devices 10C.

Referring to FIG. 4b, the first portion 14A includes a first portion second long side 14E disposed opposite the first portion first long side 14D. The second portion 14B includes a second portion first long side 14F and a second portion second long side 14G disposed opposite the second portion first long side 14F. The first portion second long side 14E is hingedly connected to the second portion first long side 14F by intermediate attachment devices 14C. Referring to FIG. 4a, the intermediate attachment devices 14C are disposed regularly along the second portion first and second long sides 14E, 14F such that the second portion 14B may fold toward and under the first portion 14A as indicated by the dashed arrows.

Referring to FIGS. 4a and 4b, the bed 12A of the truck 12 includes structure forming a substantially rectangular stepped recess 12D positioned substantially between the tailgate 12B and the point of connection of the attachment devices 10C to the bed 12A. The recess 12D is configured to receive the folding wind deflector 14 when the second portion 14B is pivoted downward and under the first portion 14A as indicated by the dashed arrows and the first portion 14A is pivoted downward to a stored position, also indicated by dashed arrows.

The stepped recess 12D includes an upper floor 12E and a lower floor 12F. When the folding wind deflector 14 is in the stored position, the first portion 14A near the first portion first long side 14D rests against the upper floor 12E, and the second portion 14B rests against the lower floor 12F.

When the folding wind deflector 14 is in a deployed position, the second portion 14B is substantially parallel to the first portion 14A, and the second portion second long side 14G rests against the top edge of the tailgate 12B.

The attachment devices 10C are connected to the truck bed 12A adjacent the stepped recess 12D such that the first portion 14A pivots upwardly out of the stepped recess 12D and downwardly into the stepped recess 12D as indicated by the dashed arrows.

Figure 4C:
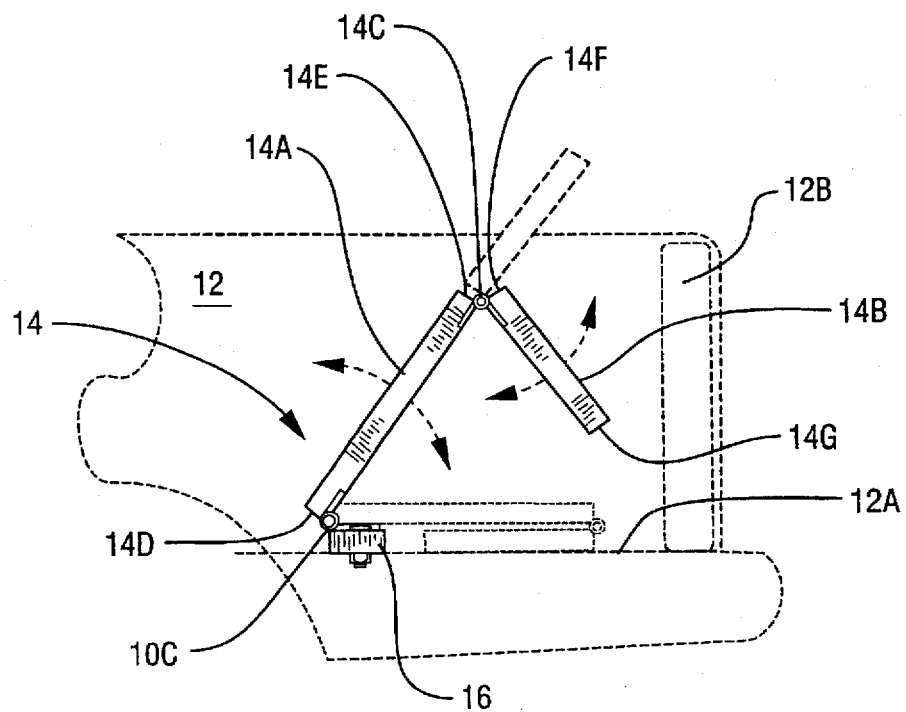
FIG. 4c is a side view showing an alternative embodiment wherein the folding wind deflector is attached to an existing, conventional truck bed.

FIG. 4c is a side view showing an alternative embodiment wherein the folding wind deflector 14 is attached to an existing, conventional truck bed 12A having no stepped recess 12D. This embodiment of the present invention is for after-market use with an existing truck 12. The folding wind deflector 14 is configured and arranged as for the already described embodiment of FIGS. 4a and 4b, except that each of the attachment devices 10C is connected to a raising member 16, using any conventional fasteners. The raising member 16 is conventionally attached to the conventional truck bed 12A.

The raising member 16 is configured to raise the first portion first long side 14D a sufficient distance from the bed 12A such that the first portion 14A rests substantially level with respect to the bed 12A when the folding wind deflector 14 is in the stored position with the second portion 14B folded underneath the first portion 14A and resting against the truck bed 12A. The raising member 16 may be any suitable shape such as a channel or bar.

The attachment devices 10C are arranged such that the first portion 14A pivots upwardly away from the truck bed 12A and the tailgate 12B and downwardly toward the truck bed 12A and the tailgate 12B as indicated by the dashed arrows.

Figure 5:
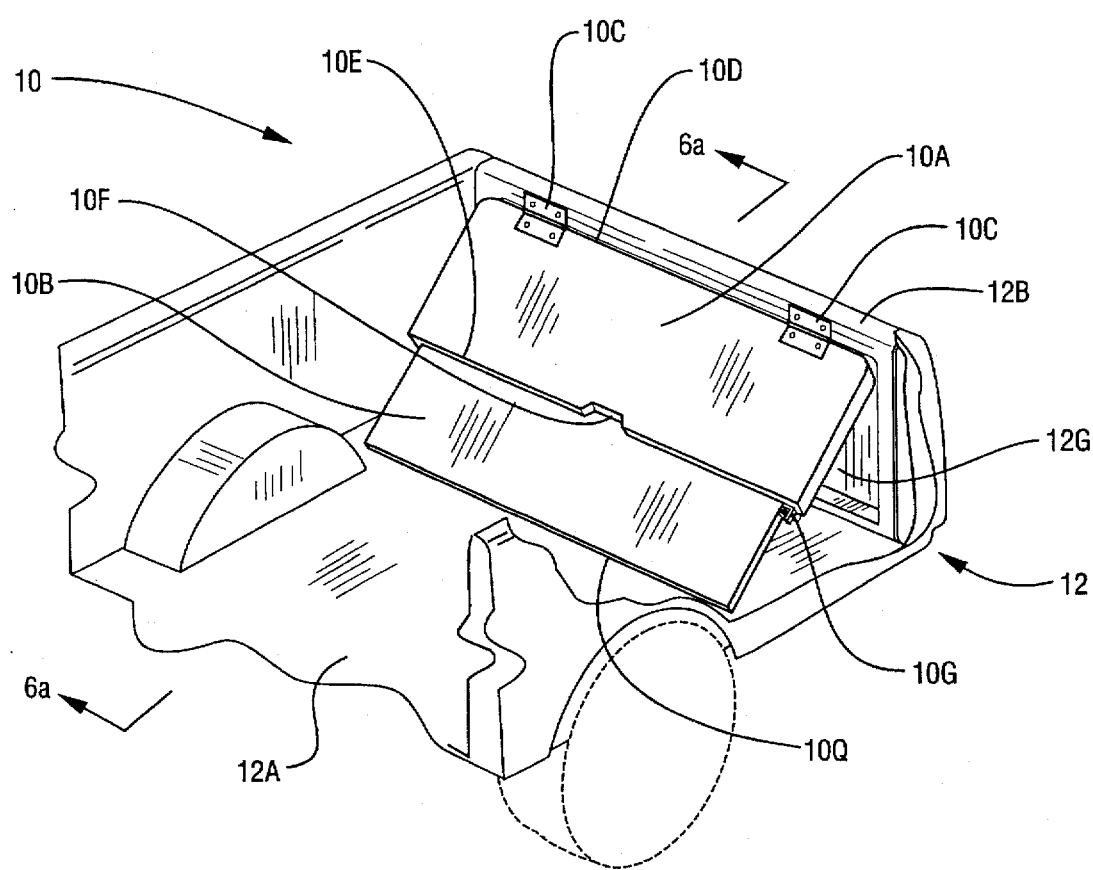
FIG. 5 is a perspective view of the telescoping wind deflector attached to a uniquely configured tailgate of the truck.
Figure 6A:
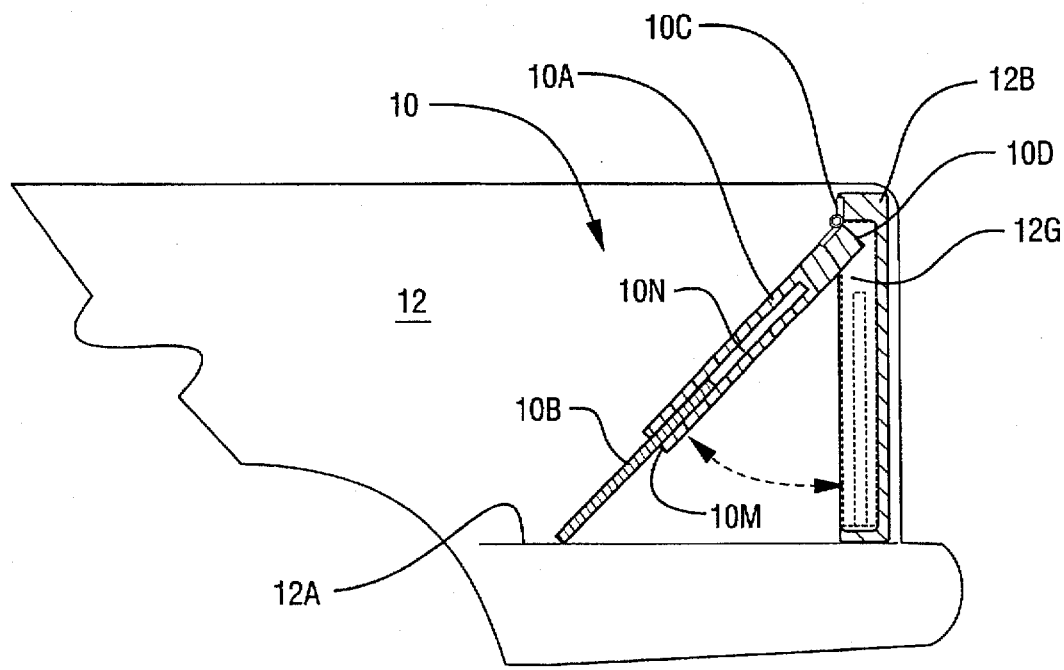
FIG. 6a is a cross-sectional view of the telescoping wind deflector taken along line 6a—6a of FIG. 5.

FIG. 5 is a perspective view of the telescoping wind deflector 10 attached to a uniquely configured tailgate 12B of a truck 12, and FIG. 6a is a cross-section taken along line 6a—6a of FIG. 5. The main body 10A and the extension 10B are configured exactly as in the description accompanying FIGS. 1 through 3a, except that the attachment devices 10C are attached to the tailgate 12B near the top edge thereof, instead of being attached to the truck bed 12A. In this configuration, the extension 10B is disposed below the main body 10A, and the distal edge 10Q of the extension 10B rests against the bed 12A when the telescoping wind deflector 10 is in the deployed position.

The tailgate 12B includes structure forming a tailgate recess 12G therein. The tailgate recess 12G is configured to receive the telescoping wind deflector 10 when the extension 10B is received within the main body 10A and the telescoping wind deflector 10 is folded downward toward the tailgate 12B.

The attachment devices 10C are arranged such that the telescoping wind deflector 10 pivots upward and out from the tailgate recess 12G and downward and into the tailgate recess 12G as indicated by the dashed arrows.

Figure 6B:
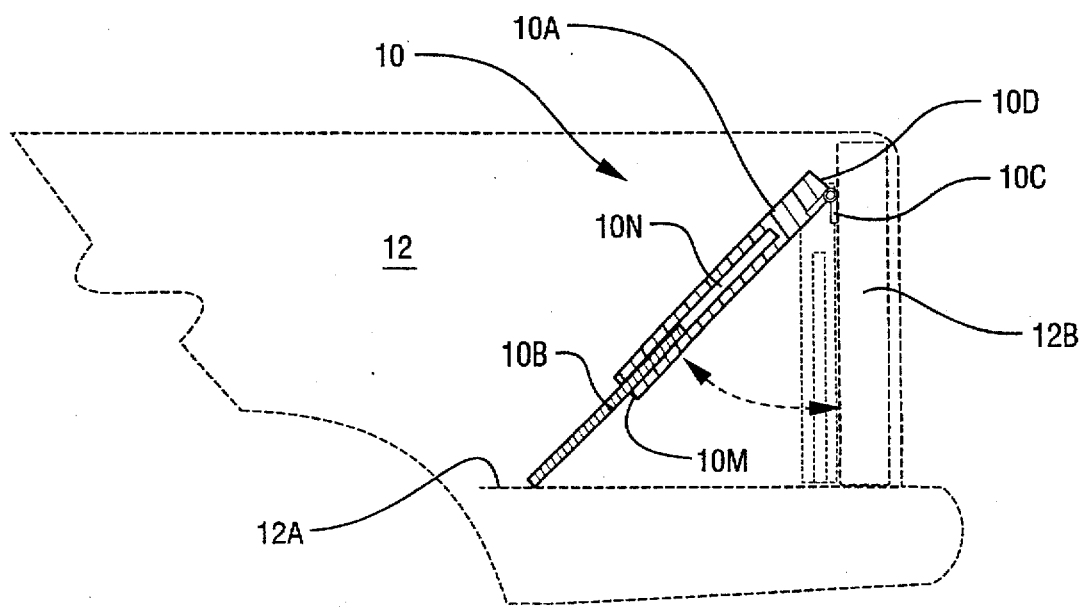
FIG. 6b is a cross-sectional view similar to FIG. 6a, except that it shows an alternative embodiment wherein the telescoping wind deflector is attached to an existing, conventional truck tailgate.

FIG. 6b is a side view similar to FIG. 6a, except that it shows an alternative embodiment of the telescoping wind deflector 10 wherein the tailgate 12B is conventional and includes no tailgate recess 12G. This embodiment of the present invention is for after-market use with an existing truck 12. The telescoping wind deflector 10 is configured and arranged as for the already described embodiment of FIGS. 5 and 6a except that the attachment devices 10C are configured for attachment to an existing tailgate 12G using conventional fasteners. The attachment devices 10C attached to the existing tailgate 12B near the top edge thereof, and are arranged such that the main body 10A pivots upwardly away from the tailgate 12B and downwardly toward the tailgate 12B as indicated by the dashed arrows. In the stored position, the telescoping wind deflector 10 rests against the tailgate 12B.

Figure 7A:
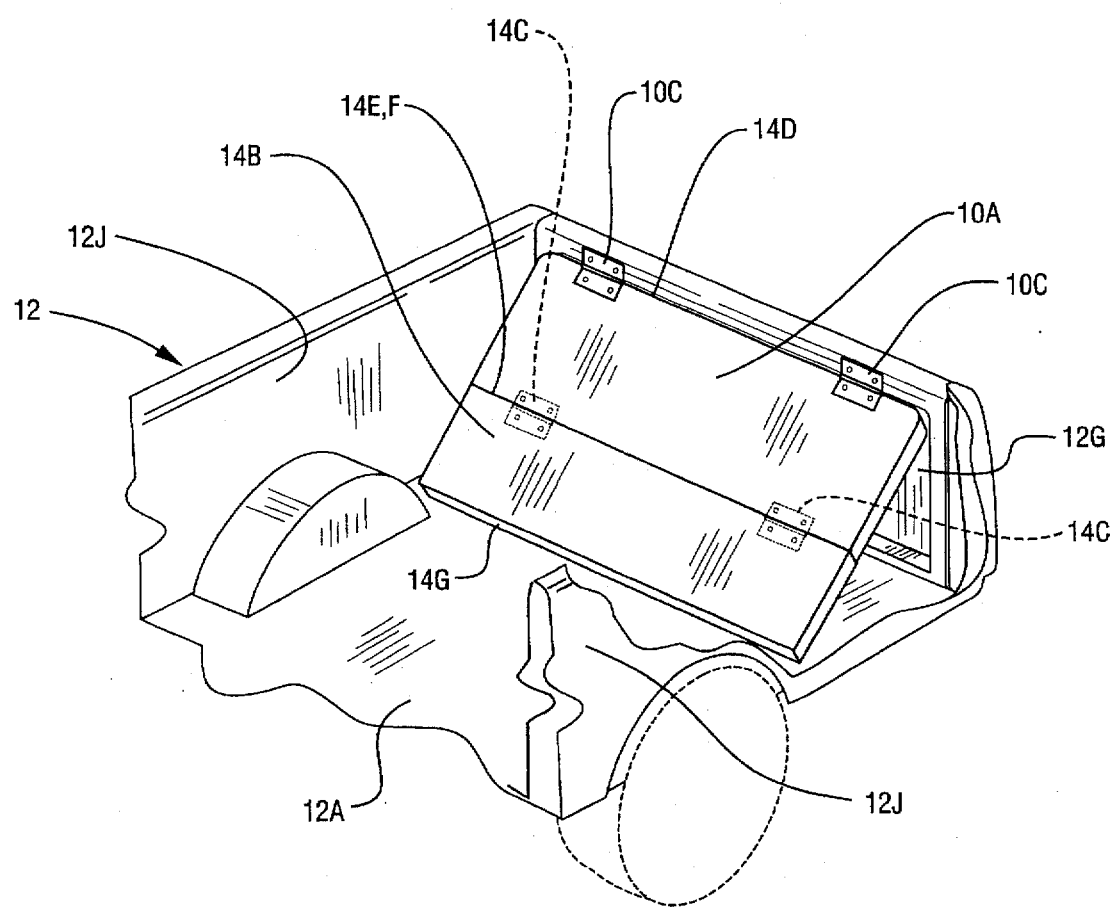
FIG. 7a is a perspective view showing a folding wind deflector attached to a uniquely configured tailgate.
Figure 7B:
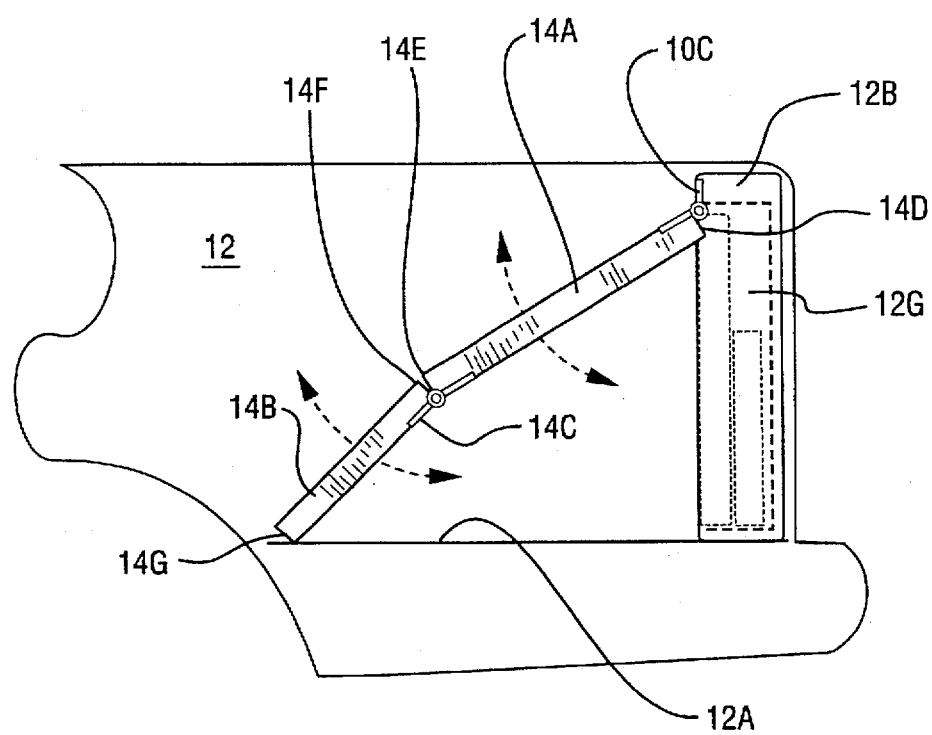
FIG. 7b is side view thereof.

FIG. 7a is a perspective of the folding wind deflector 14, attached to a uniquely configured tailgate 12B of a truck 12, and FIG. 7b is a side view thereof. The first portion 14A and the second portion 14B are configured exactly as in the description accompanying FIGS. 4a and 4b, except that the attachment devices 10C are attached to the tailgate 12B near the top edge thereof, instead of being attached to the truck bed 12A. In this configuration, the second portion 14B is disposed below the first portion 14A, and the second portion second long side 14G rests against the bed 12A when the folding wind deflector 14 is in the deployed position.

The tailgate 12B includes structure forming a tailgate recess 12G therein. The tailgate recess 12G is configured to receive the folding wind deflector 14 when the first portion 14A is folded completely against the second portion 14B and the folding wind deflector 14 is folded downward toward the tailgate 12B.

The attachment devices 10C are arranged such that the first portion 14A may pivot upward and out from the tailgate recess 12G and downward and into the tailgate recess 12G.

The intermediate attachment devices 14C are arranged such that the second portion 14B may pivot from a position parallel to the first portion 14A to a completely folded position against the first portion 14A and between the tailgate 12B and the first portion 14A, as indicated dashed arrows and dashed lines of FIG. 7b.

Figure 7C:
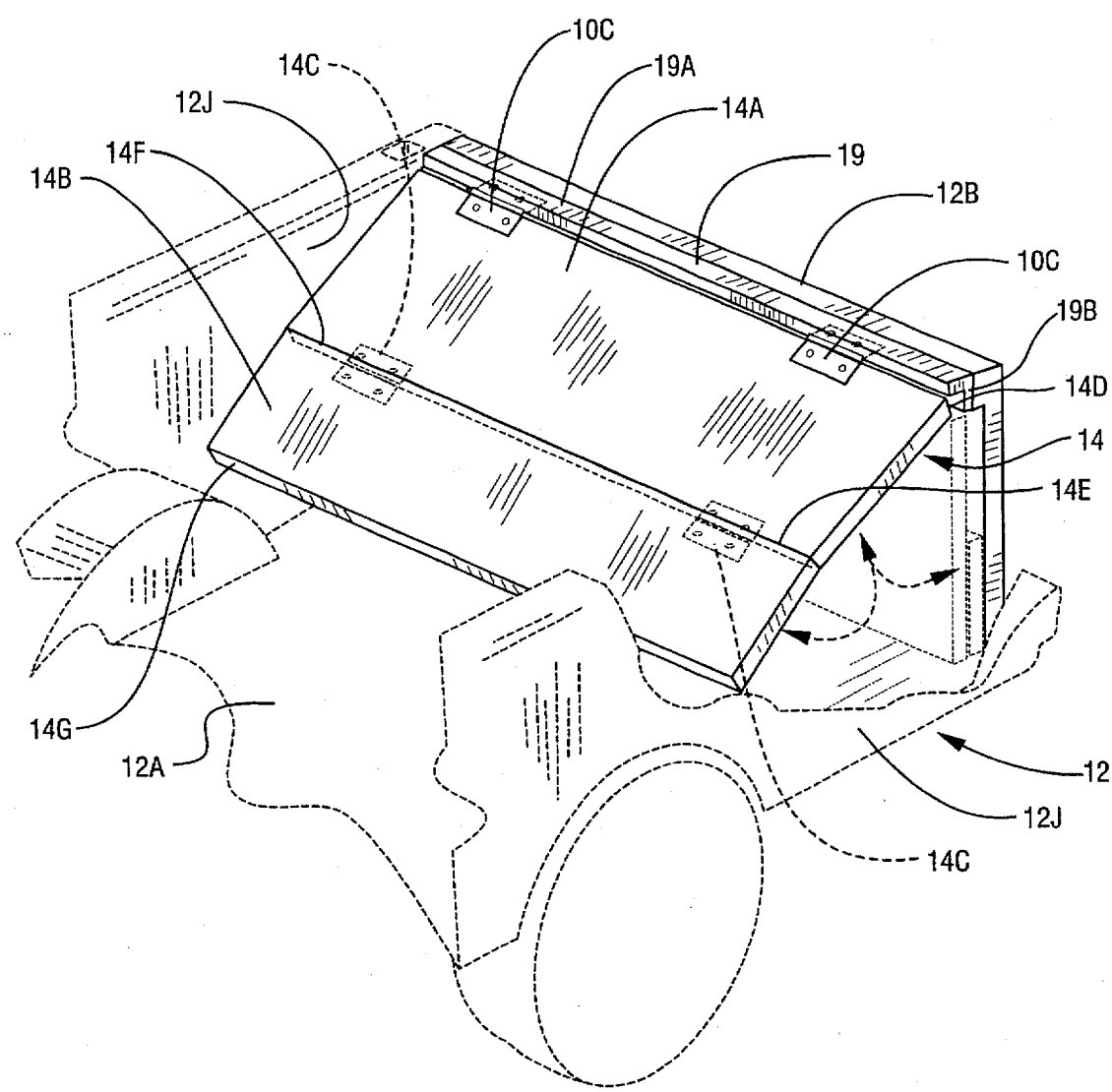
FIG. 7c is a perspective view showing an alternative embodiment wherein the folding wind deflector is attached to an angle member which is attached to an existing, conventional truck bed tailgate.

FIG. 7c is a perspective view showing an alternate embodiment wherein the folding wind deflector 14 is attached to an angle member 19 which is attached to the tailgate 12B near the top edge of the tailgate 12B. A lower leg 19B of the angle member 19 is attached to the tailgate 12B and a top leg 19A of the angle member 19 extends outward from the tailgate 12B substantially parallel to the bed 12A.

The tailgate 12B is conventional and includes no tailgate recess 12G. This embodiment is for after-market use with an existing truck 12.

The first portion 14A and the second portion 14B are configured exactly as in the description accompanying FIGS. 7a and 7b, except that the attachment devices 10C are attached to the top leg of the angle member 19, instead of being attached to the tailgate 12B.

The attachment devices 10C are arranged such that the first portion 14A may pivot upward and away from the tailgate 12B and downward and toward the tailgate 12B.

The intermediate attachment devices 14C are arranged such that the second portion 14B may pivot from a position parallel to the first portion 14A to a completely folded position against the first portion 14A and between the tailgate 12B and the first portion 14A, as indicated by the dashed arrows and dashed lines of FIG. 7c.

Figure 8:
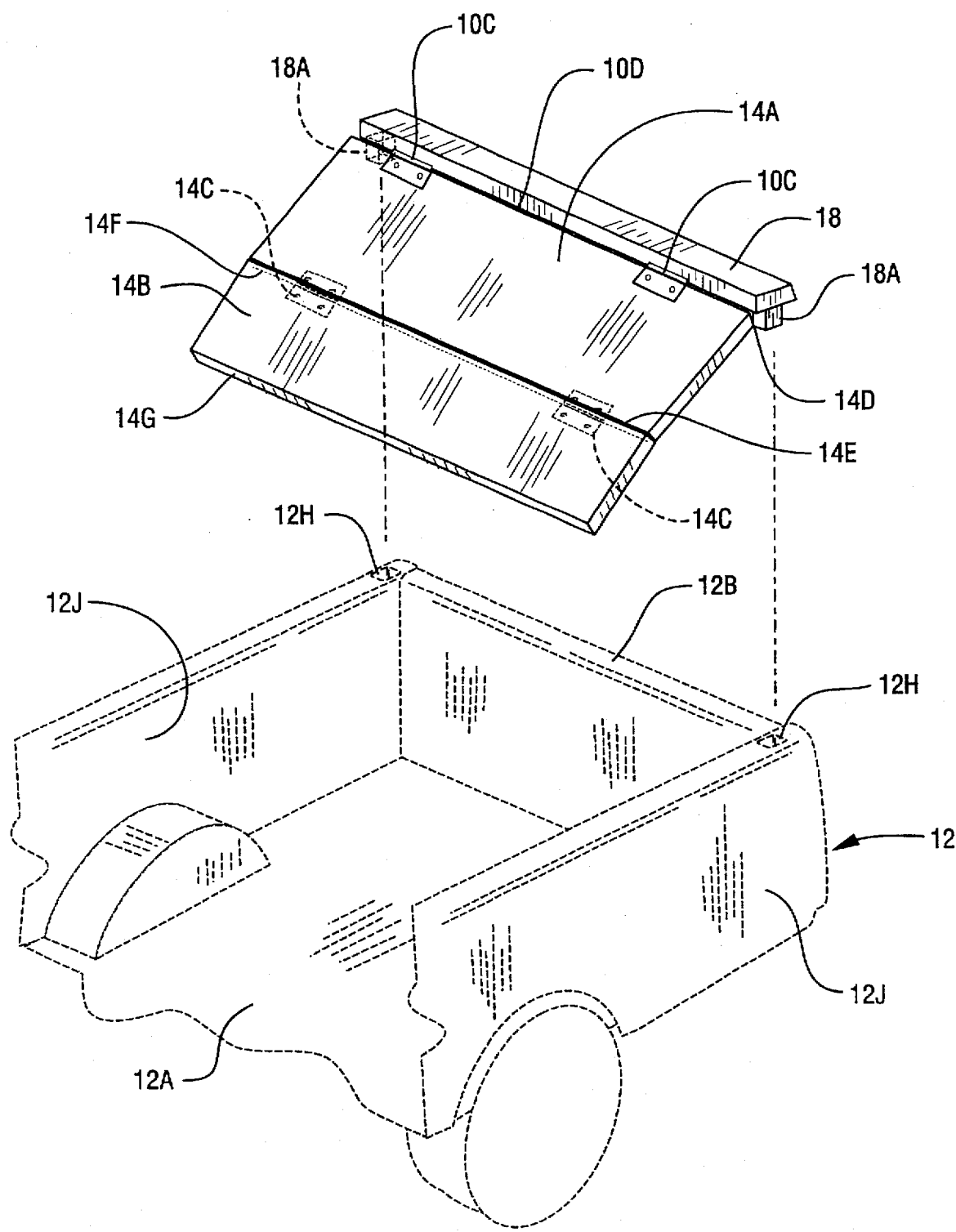
FIG. 8 is a perspective exploded view showing an alternative embodiment wherein the folding wind deflector is attached to a support member having protuberances which engage the truck's stake holes.

FIG. 8 is a perspective exploded view showing an alternate embodiment wherein the folding wind deflector 14 is attached to a support member 18 which is removably attachable to the truck 12 by insertion of protuberances 18A from the support member 18 into conventional truck stake holes 12H.

The tailgate 12B is conventional and includes no tailgate recess 12G. This embodiment is for after-market use with an existing truck 12.

The support member 18 is substantially rectangular and extends from one side wall 12J to the other side wall 12J. The protuberances 18A are located near each distal end of the support member 18 and are arranged and configured to fit within the stake holes 12H.

The first portion 14A and the second portion 14B are configured exactly as in the description accompanying FIG. 7c, except that the attachment devices 10C are attached to the underside of the support member 18 instead of to the angle member 19.

The attachment devices 10C are arranged such that the first portion 14A may pivot upward and away from the tailgate 12B and downward and toward the tailgate 12B.

The intermediate attachment devices 14C are arranged such that the second portion 14B may pivot from a position parallel to the first portion 14A to a completely folded position against the first portion 14A and between the tailgate 12B and the first portion 14A, similar to the position indicated by the dashed arrows and dashed lines of FIG. 7c.

Figure 9:
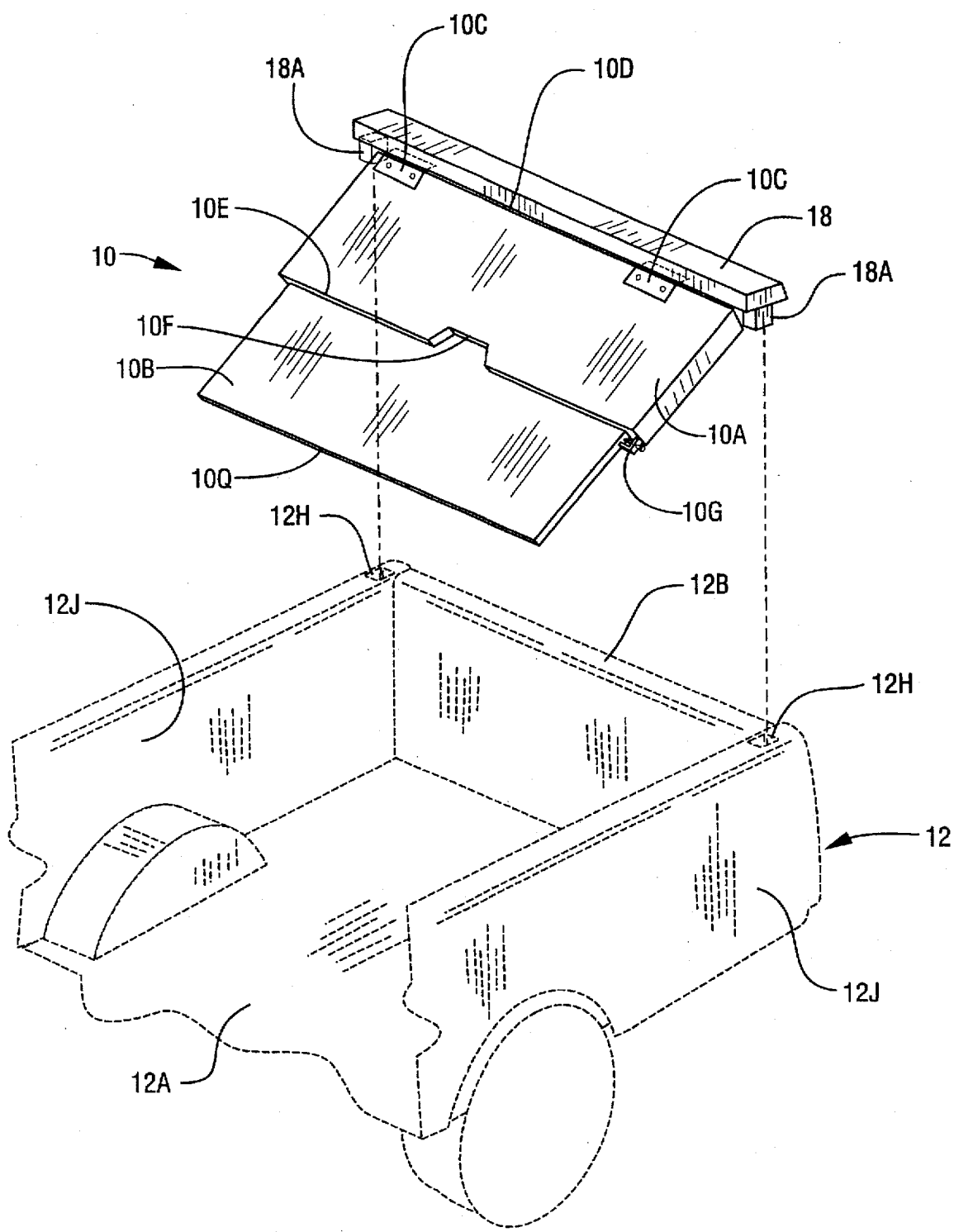
FIG. 9 is a perspective exploded view showing an alternative embodiment wherein the telescoping wind deflector is attached to a support member having protuberances which engage the truck's stake holes.

FIG. 9 is a perspective exploded view showing an alternative embodiment wherein the telescoping wind deflector 10 is attached to a support member 18 which is removably attachable to the truck 12 by insertion of protuberances 18A from the support member 18 into conventional truck stake holes 12H.

The tailgate 12B is conventional and includes no tailgate recess 12G. This embodiment is for after-market use with an existing truck 12.

The support member 18 is substantially rectangular and extends from one side wall 12J to the other side wall 12J. The protuberances 18A are located near each distal end of the support member 18 and are arranged and configured to fit within the stake holes 12H.

The main body 10A and the extension 10B are configured exactly as in the description accompanying FIGS. 5 and 6b, except that the attachment devices 10C are attached to the underside of the support member 18 instead of to the tailgate 12B.

The attachment devices 10C are arranged such that the first portion 14A may pivot upward and away from the tailgate 12B and downward and toward the tailgate 12B.

Figure 10A:
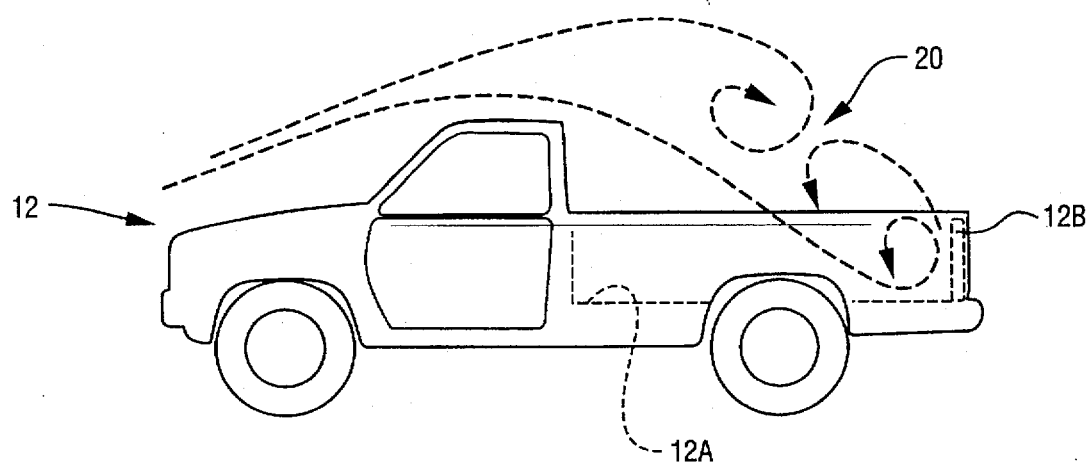
FIG. 10a is a side elevational view of a truck without a wind deflector, illustrating the resultant turbulent airflow.

FIG. 10a is a side elevational view of a truck 12 without a wind deflector 10, 14, illustrating the resultant turbulent air flow 20 when the truck 12 is moving forward, and the air impinges on the tailgate 12B.

Figure 10B:
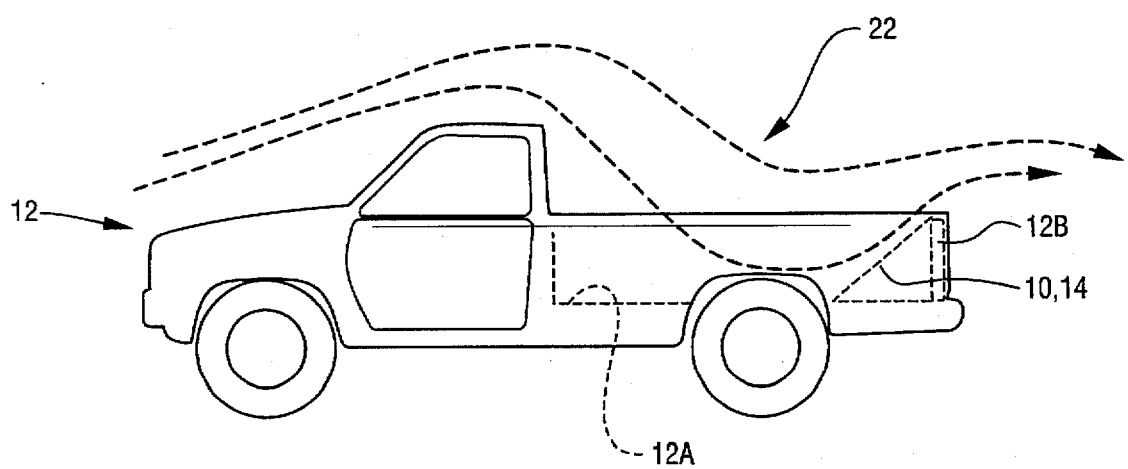
FIG. 10b is a side elevational view of a truck with the present invention deployed, illustrating the aerodynamically improved airflow.

FIG. 10b is a side elevational view of a truck 12 with a wind deflector 10, 14 deployed, illustrating the aerodynamically improved airflow 22 as the air passes over the inclined wind deflector 10, 14 and the tailgate 12B.

The wind deflector 10, 14 may be constructed of wood, plastic, metal or any suitable material.

The foregoing description is included to describe some embodiments of the present invention including the preferred embodiment, and is not meant to limit the scope of the invention. From the foregoing description, many variations will be apparent to those skilled in the art that would be encompassed by the spirit and scope of the invention. The scope of the invention is to be limited only by the following claims.

The invention claimed is:

1. A wind deflector for use in a truck, the wind deflector comprising:

a. a substantially rectangular, substantially planar first section;

b. a substantially rectangular, substantially planar second section;

c. structure forming a slot within the first section;

d. structure forming a cavity within the first section, the cavity in physical communication with the slot and configured to contain the second section;

e. the second section being extendable and retractable through the slot;

f. the wind deflector adapted to extend between a top edge of a tailgate and a bed of the truck, forming an inclined surface over which air flows when the truck is in forward motion; and g. a securing means for securing the second section in a fully extended position and for preventing separation of the second section from the first section, even when the wind deflector is not in contact with both the top edge of the tailgate and the bed of the truck.

2. The wind deflector of claim 1, wherein the securing means comprises a spring-bolt apparatus including a spring and a bolt, the spring-bolt apparatus connected to the first section near the slot, the spring configured to urge the bolt into a recess within the second section when the second section is fully extended, thus securing the second section in position and preventing separation of the second section from the first section.

* * * * *